United States Patent Office 2,796,417
Patented June 18, 1957

2,796,417

QUINAZOLONE COMPOUNDS AND METHODS OF MAKING THE SAME

Bernard Randall Baker, Nanuet, N. Y., and Merle Vernon Querry, Rivervale, N. J., assignors to American Cyanamid Company, New York, N. Y., a corporation of Maine No Drawing. Application April 3, 1952,
Serial No. 280,384

13 Claims. (Cl. 260—256.4)

This invention relates to new beta-keto-alkyl-quinazolones and acid salts thereof. This application is a continuation-in-part of copending U. S. application S. N. 205,421 filed January 10, 1951 now Patent No. 2,651,632.

The new class of beta-keto-alkyl-quinazolone compounds of this invention, when in the form of the free bases, may be represented by the following formula:

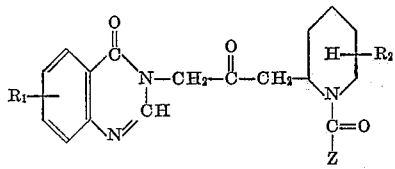

in which $R_1$ represents hydrogen or at least one substituent on the benzene ring of the quinazolone nucleus; $R_2$ represents hydrogen or at least one substituent, of a type to be more particularly described in subsequent paragraphs, on the piperidine nucleus; and

represents an acyl group capable of being readily removed by hydrolysis. As will be noticed, compounds of the above formula are organic bases and are, therefore, capable of forming addition salts with acids, for instance hydrochloric acid and sulfuric acid. Since these acid addition salts are usually the equivalent of the free base, it is intended that they also constitute a part of this invention.

The new compounds of this invention are useful in several fields of organic chemistry. A most important use is as intermediates in the preparation of compounds having antimalarial activity by the procedure disclosed in copending U. S. application S. N. 184,118 filed September 9, 1950 now abandoned. The compounds also have other utility. For instance, the new compounds are of value in the formation of colored pigments by a procedure which comprises coupling the same with arylhydrazines having an amino group capable of diazotization.

The substituent or substituents represented by $R_1$ in the above general formula may vary widely in nature and may be on one or more of the 5, 6, 7 or 8 positions of the quinazolone nucleus. As will be seen in subsequent paragraphs, this substituent does not enter into the reaction comprising the process whereby the new compounds of this invention are prepared and the variation of this substituent does not, therefore, appreciably affect nor modify the reaction. The presence and nature and substituents designated by $R_1$ are, however, very important when and if the new compounds of this invention are to be employed as intermediates in the preparation of compounds having antimalarial activity since the presence and nature of such a substituent or substituents materially modifies the antimalarial activity and therapeutic index of the resulting alkaloids. The following is a partial list of the types of substituents which have been found to be of value: halogen, for instance, Cl, Br, and Fl; alkoxy, and aryloxy, for instance, —OCH₃, —OC₂H₅, —OCH₂C₆H₅, and —OC₆H₅; hydroxyl radicals; lower alkyl radicals, for instance, methyl, ethyl, propyl and butyl; aryl radicals, for instance, phenyl and substituted phenyl radicals; acyl radicals, for instance, —COR in which R is hydrogen or lower alkyl; acyloxy radicals, for instance, —OCOR in which R may represent H or lower alkyl; carboxyl radicals (—COOH) and the esters, amides and salts thereof. Other types of useful substituents will be apparent to those skilled in the art and it is intended that this invention cover compounds of the above formula wherein $R_1$ represents any stable substituent or substituents having a reasonable number of constituent atoms, for instance less than about twelve, exclusive of hydrogen atoms.

The radical represented by $R_2$ in the above formula may also vary within wide limits and as mentioned above, may either represent hydrogen or a substituent radical or radicals. If $R_2$ is to represent a substituent radical, it should preferably be one which is attached to the piperidine nucleus by an oxygen to carbon linkage and should be either a hydroxy group or a radical capable of being readily transformed to a hydroxy group by ordinary procedures such as hydrolysis or reduction. By way of illustration, suitable substituents are: aryloxy, for instance, phenoxy; alkoxy, for instance methoxy, ethoxy and propoxy; aralkoxy, for instance alpha-toloxy; acyloxy, for instance acetoxy and benzyloxy; and the like. Such substituents may be on one or more of the three, four, and five positions of the piperidine nucleus.

As has been previously stated, the group

represents an acyl radical, or, in other words, Z represents a radical such as alkoxy, for instance, methoxy and ethoxy; alkyl such as methyl, ethyl and butyl; aryloxy, for instance, phenoxy and nitrophenoxy; aryl, for instance, phenyl and nitrophenyl.

While it is not intended that this invention be limited to beta-keto-alkyl-quinazolones made by any one specific process, a particularly convenient method of preparing the new compounds has been discovered and this new method also constitutes a part of this invention. The new method comprises reacting a quinazolone derivative with a methyl ketone derivative in accordance with the following equation:

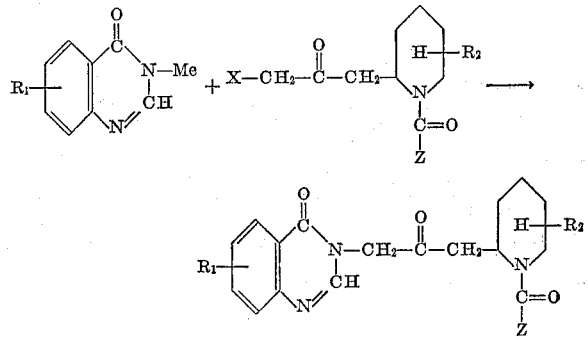

in which Me is metal or the equivalent; X is halogen or the equivalent, and $R_1$ and $R_2$ are as defined above.

The methyl ketone derivative above is preferably a halomethyl ketone: that is, X in the above equation represents halogen, for instance, chlorine, bromine, or iodine. Because of the ease of preparation and their advantageous reaction velocities, the bromomethyl ketone derivatives are preferred. However, there are certain radicals which are recognized equivalents of the halogens for condensation reactions and methyl ketone derivatives of these may also be employed in the process of this invention. Examples of such equivalent radicals are the sulfonic ester radicals, for instance

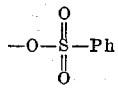

and

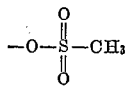

The quinazolone derivative in the above general equation is preferably a metalo-quinazolone formed either from a mono or polyvalent metal. Examples of suitable metals are the following: alkali metals, for instance, sodium, potassium, and lithium; alkaline earth metals, for instance, calcium and barium. Because of the ease of preparation and advantageous reaction velocity, the sodio-quinazolones are preferred. Again, there are certain recognized equivalents of the metals which are also suitable for the process of this invention. For example, certain quaternary ammonium derivatives of quinazolones are quite satisfactory.

The quinazolone derivatives above described may be conveniently prepared from a quinazolone and a strong base of the metal or equivalent. Examples of suitable bases are: metal hydroxides, for instance, sodium hydroxide, and barium hydroxide; quaternary ammonium bases, for instance, trimethyl benzyl ammonium hydroxide and tetraethyl ammonium hydroxide; metal hydrides, for instance, sodium hydride; metal amides, for instance, sodamide; metal alcoholates, for instance, sodium methoxide; metal alkylides, for instance, ethyl-lithium; and other bases of this type.

In general, it will be found convenient to perform the reaction of the quinazolone derivative with the methyl ketone derivative in an inert solvent or diluent. Any inert liquid may be used but for reasons of convenience, the lower alcohols, such as methanol, ethanol, propanol, 2-methoxyethanol, and the like are the most satisfactory. Examples of other inert liquids which may be used are the simple ethers, for instance, methyl or ethyl ether; cyclic ethers, for instance, dioxane; aralkyl alcohols, for instance, benzyl alcohol; and esters, for instance, ethyl-acetate. When a solvent is employed the quinazolone derivative may advantageously be formed in situ without the need of isolation.

Temperature in the above reaction is not critical and the reaction may satisfactorily be carried out at room temperature. It has, however, been found that higher temperatures favor the reaction, and the reaction may generally be advantageously performed at temperatures between 25° C. and 85° C. While convenience would ordinarily limit one to the reflux temperature of the solvent employed, the reaction may be, if desired, carried out at temperatures up to the decomposition temperature of the reactants or reaction product. Also in some cases, for instance when there is a tendency for one or both of the reactants to engage in side reactions, it has been found advantageous to perform the reaction at very low temperatures, for instance −3° C. Here again one is ordinarily limited, as a matter of convenience, by the solidification temperature of the solvent employed.

The reaction proceeds immediately at room temperature and in most instances is substantially complete in about one to four hours. The reaction in most instances is substantially complete in about ten to thirty minutes at 80° C. and in a proportional length of time at intermediate temperatures.

The invention is more fully illustrated by the following examples in which all parts are by weight unless otherwise specified:

Example I

A solution of .25 part by weight of piperidyl-2-acetic acid (Ber., 35, 1348) in 4.1 parts by volume of 1N sodium hydroxide is vigorously shaken with 0.21 part by volume of benzoyl chloride for ten minutes, then acidified with hydrochloric acid. The mixture is extracted with chloroform. Evaporation of the extracts and crystallization from benzene-heptane gives about .18 part by weight of white crystals of 1-benzoyl-2-piperidyl acetic acid, having a melting point of 144° C.–145° C. This compound is soluble in hot water, insoluble in cold water or petroleum ether, but readily soluble in alcohol, chloroform or benzene.

To a suspension of 5 parts by weight of 1-benzoyl-2-piperidyl-acetic acid in 25 parts by volume of acetyl chloride is added 4.5 parts by weight of phosphorus pentachloride. After twenty minutes the solvent is removed in vacuo and the evaporation repeated with 50 parts by volume of toluene. The resultant acid chloride dissolved in 25 parts by volume of benzene is added to an ice-cooled ethereal solution of diazomethane (prepared from 10.5 parts by weight of nitrosomethylurea). After ten minutes in the ice-bath and one hour at room temperature, 5 parts by volume of acetic acid followed by 21 parts by volume of 30% hydrogen bromide in acetic acid are added. The mixture, after five minutes, is washed with water, aqueous sodium bicarbonate and water. Evaporation of the solvent in vacuo gives about 5.2 parts by weight of 1-benzoyl-2-(gamma-bromoacetonyl) piperidine and an orange oil which is soluble in all common solvents except water and the petroleum ethers.

To a solution of .225 part by weight of 4-quinazolone in 1.55 parts by volume of 1N methanolic sodium methoxide is added a solution of 0.58 part by weight of 1-benzoyl-2-(gamma-bromoacetonyl) piperidine in 5.8 parts by volume of methanol. After one hour the solution is diluted with 25 parts by volume of water and 10 parts by volume of 10% sodium hydroxide, then extracted with chloroform. The extracts are evaporated to dryness and the residue converted to the hydrochloride with alcoholic hydrogen chloride. There is obtained white crystals of 3-[beta-keto-gamma-(1-benzoyl-2-piperidyl)propyl]-4-quinazolone hydrochloride. This compound is soluble in cold water, hot methanol or ethanol, but insoluble in acetone, ethyl acetate, benzene or petroleum ether.

Example II

To a solution of 7 parts by weight of sodium methoxide in 100 parts by volume of methanol there is added 20.6 parts by weight of 3-chloro-3-carbethoxy-2-piperidone (J. Am. Chem. Soc., 71, 2818 (1949)). The solution is refluxed and stirred for ninety minutes, acidified with acetic acid and cooled. The salt is removed by filtration and the filtrate evaporated to dryness. A little water is added and the solution extracted with chloroform. The solvent is removed in vacuo and the residue distilled. The product is a colorless viscous oil, having a boiling point of 142°–150° C. (0.15 mm.) which solidifies and melts at 60°–67° C. Several recrystallizations from benzene-petroleum ether gives white crystals of 3-methoxy-3-carbomethoxy-2-piperidone having a melting point of about 79.5° to 80° C. This compound is readily soluble in water, alcohol, acetone and benzene, but insoluble in petroleum ether.

A solution of 36.4 parts by weight of 3-methoxy-3-carbomethoxy-2-piperidone in 122 parts by volume of 6 N hydrochloric acid is refluxed for one hour and then evaporated to dryness in vacuo. The resulting crude 2-methoxy-5-aminovaleric acid hydrochloride, is dissolved in 430 parts by volume of water containing 37.3 parts by weight of sodium hydroxide, then treated dropwise with 60 parts by volume of benzyl chlorocarbonate with stirring and ice-cooling at such a rate that the temperature is 6° C.–8° C. After being stirred an additional forty-five minutes, the mixture is extracted with ethyl acetate. Acidification of the aqueous phase gives an oil which is isolated by extraction with ethyl acetate. From this oil, 2-methoxy-5-carbobenzoxyaminovaleric acid is obtained as white crystals having a melting point of about 63° C.–65° C., by crystallization from benzene-petroleum ether. This compound is soluble in all common solvents except water and petroleum ether.

To a solution of 83 parts by weight of 2-methoxy-5-carbobenzoxyaminovaleric acid in 200 parts by volume of acetyl chloride there is added 67 parts by weight of phosphorus pentachloride in portions over a period of seven minutes. Hydrogen chloride is evolved and the reaction is slightly exothermic. After standing for twenty-three minutes more, the solution is evaporated to dryness in vacuo (bath 50° C.). After the addition of 200 parts by volume of toluene, the evaporation is repeated (bath 50° C.). The residual acid chloride, dissolved in 200 parts by volume of toluene, is condensed with 141 parts by volume of ethyl malonate and 66.2 parts by weight of magnesium methoxide in 300 parts by volume of toluene. The mixture is treated with 59 parts by volume of acetic acid and 230 parts by volume of 3 N hydrochloric acid. The separated toluene layer is washed with water and evaporated to dryness in vacuo. The residual oil is dissolved in 200 parts by volume of toluene and 500 parts by volume of heptane, then extracted three times with ice-cold 3% sodium hydroxide. Acidification gives an oil which is isolated by extraction with ethyl acetate. This ethyl (2-methoxy-5-carbobenzoxyaminovaleryl)malonate is readily soluble in most solvents except water and petroleum ethers. It is also soluble in aqueous sodium hydroxide.

A solution of 25 parts by weight of ethyl (2-methoxy-5-carbobenzoxyaminovaleryl)malonate in 75 parts by volume of acetic acid is shaken with 5 parts by weight of activated carbon (Norit) for ten minutes. The mixture is filtered and the activated carbon (Norit) washed with 25 parts by volume of acetic acid. The filtrate is shaken with hydrogen in the presence of 5 parts by weight of 10% palladium charcoal for about one hour to obtain approximately a 70% uptake of one mole-equivalent of hydrogen. Then, .5 part by weight of platinum oxide catalyst is added and the hydrogenation continued for an additional three hours. The catalysts are removed by filtration and the filtrate is evaporated to dryness in vacuo. The resulting crude 3-methoxypiperidine-2-malonic ester is refluxed with 128 parts by volume of 6N hydrochloric acid for two hours. The solution is evaporated to dryness in vacuo. The residual gum is dissolved in 42 parts by volume of water, cooled in an ice-bath with stirring and treated with 74 parts by volume of 10% sodium hydroxide. When the temperature returns to about 6° C. a solution of 6.2 parts by volume of ethyl chlorocarbonate in 30 parts by volume of toluene is added over a period of ten minutes. After being stirred fifteen minutes more, 50 parts by volume of 10% sodium hydroxide is added followed by the dropwise addition 6.2 parts by volume of ethyl chlorocarbonate in 30 parts by volume of toluene. The solution is stirred one hour more in the ice-bath, then extracted with ethyl acetate. The aqueous layer is acidified and extracted with chloroform. The combined extracts are evaporated to dryness in vacuo to obtain a yield of about 5 parts by weight of a viscous oil. This 1-carbethoxy-3-methoxy-2-piperidyl-acetic acid is slightly soluble in water, soluble in alcohol acetone and benzene, but insoluble in petroleum ether.

To a solution of 5.3 parts by weight of 1-carbethoxy-3-methoxypiperidine-2-acetic acid in 25 parts by volume of acetyl chloride there is added 5.1 parts by weight of phosphorus pentachloride. After twenty minutes solvent is removed in vacuo (bath 45°–50° C.), then 37 parts by volume of toluene is added and the evaporation repeated. The residual acid chloride dissolved in 33 parts by volume of benzene is added dropwise to an ice-cooled solution of ethereal diazomethane (prepared from 13 parts by weight of nitrosomethylurea) over a period of seven minutes. After ten minutes more in the ice-bath, the solution is allowed to stand at room temperature for seventeen hours. The excess diazomethane is destroyed by the addition of 7.8 parts by volume of acetic acid. Then 24 parts by volume of 30% hydrobromic acid in acetic acid is gradually added with ice-cooling. After an additional five minutes the solution is washed twice each with water, excess aqueous sodium bicarbonate and water. The solution is evaporated to dryness in vacuo to obtain a yield of about 5 parts by weight of a light brown oil of 1-carbethoxy-2-(gamma-bromoacetonyl)-3-methoxy-piperidine which is readily soluble in common organic solvents except petroleum ether and is also insoluble in water.

To a solution of 2.15 parts by weight of 4-quinazolone in 15 parts by volume of 1 N methanol solution of sodium methoxide there is added a solution of 5.1 parts by weight 1-carbethoxy-2-(gamma-bromoacetonyl)-3-methoxy-piperidine in 51 parts by volume of methanol. After one hour at room temperature the solution is diluted with 205 parts by volume of ice water and 82 parts by volume of 10% sodium hydroxide. A gum separates which is removed by extraction with chloroform. The combined extracts are evaporated to dryness in vacuo. The residue is crystallized from benzene-heptane. Recrystallization from the same solvents give white crystals of 3-[beta-keto-gamma-(1-carbethoxy - 3 - methoxy-2-piperidyl)propyl] - 4 - quinazolone. This compound is readily soluble in alcohol, acetone, benzene, chloroform, or ethyl acetate, but insoluble in petroleum ether or water.

*Example III*

By the condensation of 2.1 parts by weight of 6-chloro-4-quinazolone (J. Am. Chem. Soc., 68, 1304) in 12 parts by volume of a 1 N methanol solution sodium methoxide with 1-carbethoxy-2-(gamma-bromoacetonyl)-3-methoxypiperidine by the same procedure as employed in Example II there is obtained 3-[beta-keto-gamma-(1-carbethoxy - 3 - methoxy - 2 - piperidyl) - propyl] - 6-chloro-4-quinazolone having a melting point of about 124°–125° C. This compound forms white crystals readily soluble in alcohol, acetone, ethyl acetate, chloroform or benzene, but insoluble in water or petroleum ether.

*Example IV*

By the condensation of 1.34 parts by weight of 6-methyl-4-quinazolone (Ber. 34, 3776) in 8.8 parts by volume of a 1 N methanol solution of sodium methoxide with 2.9 parts by weight of 1-carbethoxy-2-(gamma-bromo-acetonyl)-3-methoxypiperidine according to the procedure of Example II there is obtained about 1 part by weight of white crystals of 3-[beta-keto-gamma-(1-carbethoxy - 3 - methoxy - 2 - piperidyl)propyl] - 6-methyl-4-quinazolone, having a melting point of about 113°–115° C. This compound is insoluble in water or petroleum ether, but soluble in alcohol, chloroform benzene or acetone.

*Example V*

By the condensation of 1.86 parts by weight of 6-methoxy-4-quinazolone (J. Am. Chem. Soc., 68, 1302) in 11 parts by volume of a 1 N methanol solution of sodium methoxide with 3.6 parts by weight of 1-carbethoxy - 2 - (gamma - bromoacetonyl) - 3 - methoxy-piperidine according to the procedure of Example II there is obtained white crystals of 3-[beta-keto-gamma-(1 - carbethoxy - 3 - methoxy - 2 - piperidyl) - propyl]-6-methoxy-4-quinazolone having a melting point of about 102°–103° C. This compound is soluble in alcohol, acetone, chloroform or benzene, but insoluble in water or petroleum ether.

Example VI

A stirred solution of 49.5 parts by weight of 7-chloroisatin (Helv. Chim. Acta, 2, 239) in 485 parts by volume of 5% sodium hydroxide is treated with 73 parts by volume of 30% hydrogen peroxide over a period of twenty minutes. The solution is stirred twenty minutes longer, clarified with activated carbon (Norit) and acidified to obtain a yield of about 36 parts by weight of 3-chloroanthranilic acid having a melting point of about 187° C.–188° C.

A mixture of 35.2 parts by weight of 3-chloroanthranilic acid and 31 parts by volume of formamide is heated at 130° C.–135° C. for forty-five minutes and at 175° C. for seventy-five minutes. Addition of 50 parts by volume of 2-methoxyethanol and 500 parts by volume of water gives 31 parts by weight of 8-chloro-4-quinazolone which forms on recrystallization from 2-methoxyethanol, white crystals having a melting point of 299° C.–300° C.

By condensation of 1.7 parts by weight of 8-chloro-4-quinazolone in 9.8 parts by volume of a 1 N methanol solution of sodium methoxide with 3.2 parts by weight of 1 - carbethoxy - 2 - (gamma - bromoacetonyl) - 3 - methoxy-piperidine according to the procedure of Example II there is obtained white crystals having a melting point of about 153° C.–154° C. of 3-[beta-keto-gamma-(1 - carbethoxy - 3 - methoxy - 2 - piperidyl)propyl]-8-chloro-4-quinazolone. This compound is soluble in acetone, chloroform or benzene, but insoluble in water or petroleum ether.

Example VII

By condensation of 1.6 parts by weight of 8-methyl-4-quinazolone (Ber. 38, 3555) in 10.5 parts by volume of a 1 N methanol solution of sodium methoxide with 3.45 parts by weight of 1-carbethoxy-2-(gamma-bromoacetonyl)-3-methoxypiperidine according to the procedure of Example II there is obtained 3-[beta-keto-gamma-(1-carbethoxy - 3 - methoxy - 2 - piperidyl)propyl] - 8-methyl-4-quinazolone as white crystals having a melting point of about 143° C.–145° C. This compound is insoluble in water or petroleum ether, but soluble in chloroform, ethyl acetate, alcohol or benzene.

Example VIII

By condensation of 1.94 parts by weight of 7-chloro-4-quinazolone (J. Am. Chem. Soc., 69, 184) in 11 parts by volume of a 1 N methanol solution of sodium methoxide with 3.65 parts by weight of 1-carbethoxy-2-(gamma-bromoacetonyl)-3-methoxy-piperdine according to the procedure of Example II there is obtained 3-[beta-keto - gamma - (1 - carbethoxy - 3 - methoxy - 2 - piperidyl)-propyl]-7-chloro-4-quinazolone as white crystals have a melting point of about 125° C.–126° C. This compound is insoluble in water or petroleum ether, but soluble in methanol, chloroform or benzene.

Example IX

A solution of 11.8 parts by weight of 4-chloro-7-methoxysatin (Helv. Chim. Acta, 2, 239) in 100 parts by volume of 5% sodium hydroxide is treated with 15 parts by volume of 30% hydrogen peroxide over a period of ten minutes. After ten minutes more the solution is clarified with activated carbon (Norit) and neutralized with hydrochloric acid. The 3-methoxy-6-chloroanthranilic acid crystallizes, which after recrystallization from aqueous methanol has a melting point of about 145° C.–146° C.

A mixture of 2.4 parts by weight of 3-methoxy-6-chloroanthranilic acid and 1 part by volume of formamide is fused in the same manner as described for 8-chloro-4-quinazolone in Example VI. The resulting 5-chloro-8-methoxy-4-quinazolone forms white crystals from 2-methoxyethanol having a melting point with decomposition of about 311° C.–313° C.

By condensation of 1.8 parts by weight of 5-chloro-8-methoxy-4-quinazolone in 9.4 parts by volume of 1 N methanolic sodium methoxide and 15 parts by volume of 2-methoxyethanol with 3.1 parts by weight of 1-carbethoxy - 2 - (gamma - bromoacetonyl) - 3 - methoxypiperidine in 31 parts by volume of methanol according to the procedure of Example II there is obtained white crystals of 3-[beta-keto-gamma-(1-carbethoxy-3-methoxy-2-piperidyl)propyl]-5-chloro-8-methoxy-4-quinazolone.

Example X

By condensing 1.85 parts by weight of 5-methyl-4-quinazolone (Ber., 52, 1084) in 12 parts by volume of a 1 N methanol solution of sodium methoxide with 4 parts by weight of 1-carbethoxy-2-(gamma-bromoacetonyl)-3-methoxypiperidine according to the procedure of Example II there is obtained approximately 4 parts by weight of 3-[beta-keto-gamma-(1-carbethoxy-3 - methoxy - 2 - piperidyl) - propyl] - 5 - methyl - 4-quinazolone as a gum.

Example XI

By fusion of 12.6 parts by weight of 6-chloroanthranilic acid (Monats., 22, 488) with 11 parts by volume of formamide according to the procedure employed in Example VI, there is obtained approximately 10 parts by weight of tan crystals of 5-chloro-4-quinazolone, which after recrystallization from aqueous 2-methoxyethanol, have a melting point of about 210° C.

By condensing 2.1 parts by weight of 5-chloro-4-quinazoline in 12 parts by volume of a 1 N methanol solution of sodium methoxide according to the procedure of Example II, there is obtained 3-[beta-keto-gamma-(1-carbethoxy - 3 - methoxy - 2 - piperidyl)propyl] - 5 - chloro-4-quinazolone as a gum.

Example XII

To a solution of 65.7 parts by weight of ethyl phenoxymalonate (J. Am. Chem. Soc. 62, 1155) in 66 parts by volume of t-butyl alcohol there is added 0.6 part by weight of sodium methoxide and 15.4 parts by volume of acrylonitrile. After ten minutes, the mixture is heated at 100° C. under a condenser for about one hour, then acidified with 2 parts by volume of acetic acid, washed with water and distilled. The product, ethyl cyanoethyl phenoxymalonate, is a colorless oil having a boiling point of 158° C. (0.1 mm.). This compound is soluble in alcohol, acetone, carbon tetrachloride or toluene, but is insoluble in water.

A mixture of 60 parts by weight of ethyl cyanoethyl phenoxymalonate and 120 parts by volume of diethyl carbitol is shaken with hydrogen at 2–3 atmospheres in the presence of Raney nickel at 100° C. for about fifteen hours during which time two mol-equivalents of hydrogen are absorbed. The filtered solution is evaporated at 10 mm. up to a bath temperature of 130° C. The residue is an oil of 3-carbethoxy-3-phenoxy-2-piperidone.

The 3-carbethoxy-3-phenoxy-2-piperidone is converted to 3 - [beta - keto -gamma - (1 - carbethoxy - 3 - phenoxy-2-piperidyl)propyl]-4-quinazolone in the same manner that 3-carbomethoxy-3-methoxy-2-piperidone is converted to 3 - [beta - keto - gamma - (1 - carbethoxy - 3 - methoxy-2-piperidyl)propyl]-4-quinazolone in Example II. This compound is an oil soluble in alcohol, chloroform or ethyl acetate, but insoluble in water, or petroleum ether.

Example XIII

A mixture of 18.4 parts by weight of 6-bromo-anthranilic acid (J. Pharm. Soc. Jap., 58, 461 (1938)) and 13.2 parts by volume of formamide is fused in the same manner as described for the fusion of 3-chloroanthranilic acid with formamide to produce 8-chloro-4-quinazolone in Example VI. The resulting 5-bromo-4-quinazolone forms tan crystals from alcohol.

By the condensation of 2.55 parts by weight of 5- bromo-4-quinazolone in 12 parts by volume of 1 N methanolic sodium methoxide with 3.9 parts by weight of 1-carbethoxy - 2 - (gamma - bromoacetonyl) - 3 - methoxypiperidine in 39 parts by volume of methanol according to the procedure of Example II there is obtained 3-[beta-keto - gamma - (1 - carbethoxy - 3 - methoxy - 2 - piperidyl)propyl]-5-bromo-4-quinazolone as a gum soluble in alcohol, acetone or ether, but insoluble in water or petroleum ether.

*Example XIV*

To a stirred mixture of 13 parts by volume of water and 132 parts by volume 96% sulfuric acid there is added 28.2 parts by weight of 3-chloro-4-methyl-alpha-isonitrosoacetanilide (Helv. Chim. Acta, 2, 234 (1919)) in portions at 65° C.–70° C. The temperature is maintained at 79° C.–81° C. for fifteen minutes more, then the mixture is poured on ice. The crude isatin mixture is dissolved in 500 parts by volume of water and 125 parts by volume of 10% sodium hydroxide by warming. The solution is clarified by filtration, then partially acidified in portions to give six crops of crystals. The early fractions are the desired 4-chloro-5-methylisatin which forms bright red crystals, having a melting point of about 242° C.–244° C., from acetic acid.

By oxidation of 6.3 parts by weight of 4-chloro-5-methylisatin with alkaline hydrogen peroxide by the procedure described in Example VI for the oxidation of 7-chloroisatin there is obtained 5-methyl-6-chloroanthranilic acid which forms crystals from ethyl acetate-heptane having a melting point of about 156° C.–157° C.

A mixture of 3.3 parts by weight of 5-methyl-6-chloroanthranilic acid and 2.7 parts by volume of formamide is fused in the same manner as described for 8-chloro-4-quinazolone in Example VI. The resulting 5-chloro-6-methyl-4-quinazolone forms yellow crystals, having a melting point of about 248° C.–249° C., from methyl Cellosolve.

By condensation of 2.38 parts by weight of 5-chloro-6-methyl-4-quinazolone in 12.8 parts by volume of 1 N methanolic sodium methoxide with 4.2 parts by weight of 1 - carbethoxy - 2 - (gamma - bromoacetonyl) - 3 - methoxypiperidine in 42 parts by volume of methanol by the procedure described in Example II, there is obtained 3-[beta - keto - gamma - (1 - carbethoxy - 3 - methoxy - 2 - piperidyl)propyl] - 5 - chloro - 6 - methyl - 4 - quinazolone as a gum soluble in methanol, chloroform or benzene, but insoluble in petroleum ethers, or water.

*Example XV*

3,4-dimethyl-alpha-isonitrosoacetanilide is prepared by condensation of 3,4-dimethylaniline (42 parts by weight) with chloral hydrate and hydroxylamine hydrochloric according to Sandmeyer (Helv. Chim. Acta, 2, 234 (1919)). This compound forms white crystals from ethyl acetate having a melting point of about 179° C.–180° C.

By cyclization of 55 parts by weight of 3,4-dimethyl-alpha-isonitrosoacetanilide with 29 parts by volume of water and 290 parts by volume of 96% sulfuric acid according to the procedure employed in Example XIV for the cyclization of 3-chloro-4-methyl-alpha-isonitrosoacetanilide, there is obtained 4,5-dimethylisatin which forms red crystals, having a melting point of about 225° C.–226° C., from 50% alcohol.

Oxidation of 12 parts by weight of 4,5-dimethylisatin with alkaline hydrogen peroxide by the procedure described in Example VI gives 5,6-dimethylanthranilic acid which forms white crystals from toluene having a melting point of about 140° C.–141° C. with decomposition.

A mixture of 5 parts by weight of 5,6-dimethylanthranilic acid and 5.2 parts by volume of formamide is fused in the same manner as described for 8-chloro-4-quinazolone in Example VI. The resulting 5,6-dimethyl-4-quinazolone forms white crystals, having a melting point of about 247° C.–248° C. with decomposition, from aqueous methyl Cellosolve.

By the condensation of 2.01 parts by weight of 5,6-dimethyl-4-quinazolone in 12 parts by volume of 1 N methanolic sodium methoxide with 3.95 parts by weight of 1-carbethoxy-2-(gamma-bromoacetonyl) - 3 - methoxypiperidine in 39 parts by volume of methanol by the procedure described in Example II, there is obtained 3-[beta - keto - gamma - (1 - carbethoxy - 3 - methoxy - 2 - piperidyl)propyl]-5,6-dimethyl-4-quinazolone as a gum soluble in methanol, ethyl acetate or chloroform, but insoluble in water or petroleum ether.

*Example XVI*

3-trifluoromethyl-alpha-isonitrosoacetanilide is obtained by condensation of 25 parts by weight of 3-trifluoromethylaniline with chloral hydrate and hydroxylamine according to Sandmeyer (Helv. Chim. Acta, 2, 234 (1919)). This compound forms white crystals, having a melting point of about 141° C.–142° C., from toluene.

By the cyclization of 13.8 parts by weight of 3-trifluoromethyl - alpha - isonitrosoacetanilide with 63 parts by volume of 96% sulfuric acid according to the procedure described in Example XIV, there is obtained 4-trifluoromethylisatin which forms orange crystals, having a melting point of about 223° C.–225° C., from xylene.

Oxidation of 11.4 parts by weight of 4-trifluoromethylisatin with alkaline hydrogen peroxide by the procedure described in Example VI gives 6-trifluoromethylanthranilic acid which forms white crystals, having a melting point of about 131° C.–132° C., from toluene-heptane.

A mixture of 4.7 parts by weight of 6-trifluoromethyl-anthranilic acid and 4 parts by volume of formamide is fused at 130° C. for two hours and 175° C. for two hours. The resulting 5-trifluoromethyl-4-quinazolone is isolated by the same procedure described in Example VI for the isolation of 8-chloro-4-quinazolone. This compound forms white crystals, having a melting point of about 236° C.–237° C., from water.

By the condensation of 2.32 parts by weight of 5-trifluoromethyl-4-quinazolone in 11.3 parts by volume of 1 N methanolic sodium methoxide with 3.7 parts by weight of 1-carbethoxy-2-(gamma-bromo-acetonyl)-3-methoxypiperidine in 37 parts by volume of methanol by the procedure described in Example II, there is obtained 3-[beta - keto - gamma - (1 - carbethoxy - 3 - methoxy - 2 - piperidyl)propyl]-5-trifluoromethyl-4-quinazolone as a gum soluble in methanol, chloroform or benzene, but insoluble in water or petroleum ether.

*Example XVII*

A solution of 3 parts by weight of 6-methoxyanthranilamide (Ann., 388, 23 (1912)) in 30 parts by volume of 89% formic acid is heated at 100° C. for two and one-half hours, then evaporated to dryness in vacuo. Crystallization from water gives 2-formylamino-6-methoxybenzamide as white crystals having a melting point of about 175° C.–176° C.

A mixture of 2.5 parts by weight of 2-formylamino-6-methoxybenzamide and 39 parts by volume of 3% sodium hydroxide is warmed a few minutes until solution is complete. Acidification gives 5-methoxy-4-quinazolone which forms white crystals, having a melting point of about 208° C.–209° C., from water.

By condensation of 1.95 parts by weight of 5-methoxy-4-quinazolone in 11.7 parts by volume of 1 N methanolic sodium methoxide and 11 parts by volume of methyl Cellosolve with 3.8 parts by weight of 1-carbethoxy-2-(gamma-bromoacetonyl)-3-methoxypiperidine in 38 parts by volume of methanol by the procedure described in Example II, there is obtained 3 - [beta - keto - gamma - (1 - carbethoxy - 3 - methoxy - 2 - piperidyl)propyl] - 5 - methoxy-4-quinazolone as a gum soluble in methanol, chloroform or benzene, but insoluble in water or petroleum ether.

*Example XVIII*

To a solution of 6 parts by weight of 5-amino-4-quinazolone (J. Am. Chem. Soc., 28, 208 (1906)) in 71 parts by volume of 42% fluoroboric acid cooled to 0° C. there is added, with stirring, a solution of 2.85 parts by weight of sodium nitrite in 4.5 parts by volume of water in portions. The mixture is stirred at 0° C. for one-half hour, then diluted with 71 parts by volume of absolute alcohol and 50 parts by volume of ether. The solid diazonium fluoroborate separates. A mixture of 10 parts by weight of this solid and 200 parts by volume of xylene is refluxed and stirred for ten minutes. The mixture is cooled, the solid is collected on a filter and dissolved in 100 parts by volume of water. The solution is clarified by filtration, then adjusted to pH 5 with sodium bicarbonate and extracted with six 15 parts by volume portions of ethyl acetate. The combined, dried extracts are evaporated leaving about 3 parts by weight of 5-fluoro-4-quinazolone which forms white crystals, having a melting point of about 225° C.–227° C., from ethyl acetate.

By the condensation of 2.29 parts by weight of 5-fluoro-4-quinazolone in 14.4 parts by volume of 1 N methanolic sodium methoxide with 4.8 parts by weight of 1-carbethoxy - 2 - (gamma - bromo - acetonyl) - 3 - methoxypiperidine in 48 parts by volume of methanol by the procedure in Example II, there is obtained 3-[beta-keto-gamma - (1 - carbethoxy - 3 - methoxy - 2 - piperidyl)-propyl]-5-fluoro-4-quinazolone as a gum soluble in methanol, chloroform or benzene, but insoluble in water or petroleum ether.

We claim:

1. The new compounds selected from the group consisting of those represented by the formula

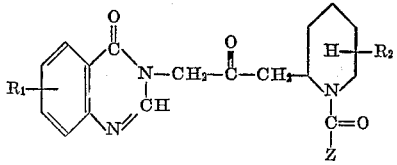

in which $R_1$ is a substituent of the group consisting of hydrogen, halo, lower alkyl and lower alkoxy radicals, $R_2$ is a member of the group consisting of hydrogen, hydroxy, lower alkoxy, and phenoxy radicals and the group

is a member of the group consisting of benzoyl and lower carbalkoxy radicals.

2. The 3 - {beta - keto - gamma - [1 - carbalkoxy - 3 - (lower alkoxy) - 2 - piperidyl]propyl} - 5 - halo - 4 - quinazolones.

3. The new compound 3 - [beta - keto - gamma - (1 - carbethoxy - 3 - methoxy - 2 - piperidyl)propyl] - 5 - chloro - 4 - quinazolone.

4. The new compound 3 - [beta - keto - gamma - (1 - carbethoxy - 3 - methoxy - 2 - piperidyl)propyl] - 5 - bromo - 4 - quinazolone.

5. The new compound 3 - [beta - keto - gamma - (1 - carbethoxy - 3 - hydroxy - 2 - piperidyl)propyl] - 5 - chloro - 4 - quinazolone.

6. The new compound 3 - [beta - keto - gamma - (1 - carbethoxy - 3 - methoxy - 2 - piperidyl)propyl] - 5 - methyl - 4 - quinazolone.

7. The new compound 3 - [beta - keto - gamma - (1 - carbethoxy - 3 - methoxy - 2 - piperidyl)propyl] - 5 - chloro - 6 - methyl - 4 - quinazolone.

8. The method of preparing compounds of the group consisting of those represented by the formula

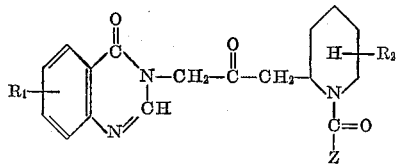

in which $R_1$ is a substituent of the group consisting of hydrogen, halo, lower alkyl and lower alkoxy radicals, $R_2$ is a member of the group consisting of hydrogen, hydroxy, lower alkoxy, and phenoxy radicals and the group

is a member of the group consisting of benzoyl and lower carbalkoxy radicals which comprises contacting under reactive conditions a compound having the formula

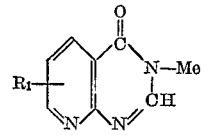

in which $R_1$ is as defined above and Me is an alkali metal with a compound having the formula

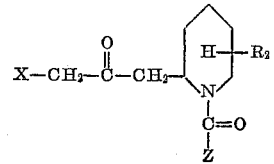

in which $R_2$ and $$-\overset{O}{\underset{\|}{C}}-Z$$

are as defined above and X is a halogen.

9. A process for preparing 3 - [beta - keto - (1 - carbethoxy - 3 - methoxy - 2 - piperidyl)propyl] - 5 - chloro - 4 - quinazolone which comprises adding 1 - carbethoxy - 2 - (gamma - bromoacetonyl) - 3 - methoxypiperidine to a solution of sodio - 5 - chloro - 4 - quinazolone in a lower alkyl alcohol solvent.

10. A process for preparing 3 - [beta - keto - (1 - carbethoxy - 3 - methoxy - 2 - piperidyl)propyl] - 5 - bromo - 4 - quinazolone which comprises adding 1 - carbethoxy - 2 - (gamma - bromoacetonyl) - 3 - methoxypiperidine to a solution of sodio - 5 - bromo - 4 - quinazolone in a lower alkyl alcohol solvent.

11. A process for preparing 3 - [beta - keto - (1 - carbethoxy - 3 - hydroxy - 2 - piperidyl)propyl] - 5 - chloro - 4 - quinazolone which comprises adding 1 - carbethoxy - 2 - (gamma - bromoacetonyl) - 3 - hydroxypiperidine to a solution of sodio - 5 - chloro - 4 - quinazolone in a lower alkyl alcohol solvent.

12. A process for preparing 3 - [beta - keto - (1 - carbethoxy - 3 - methoxy - 2 - piperidyl)propyl] - 5 - methyl - 4 - quinazolone which comprises adding 1-carbethoxy - 2 - (gamma-bromoacetonyl) - 3 - methoxypiperidine to a solution of sodio - 5 - methyl - 4 - quinazolone in a lower alkyl alcohol solvent.

13. A process for preparing 3 - [beta - keto - (1 - carbethoxy - 3 - methoxy - 2 - piperidyl)propyl] - 5 - chloro - 6 - methyl - 4 - quinazolone which comprises adding 1-carbethoxy - 2 - (gamma - bromoacetonyl) - 3 - methoxypiperidine to a solution of sodio - 5 - chloro - 6 - methyl - 4 - quinazolone in a lower alkyl alcohol solvent.

No references cited.